(12) United States Patent
Ciccimarra

(10) Patent No.: US 12,174,945 B2
(45) Date of Patent: Dec. 24, 2024

(54) METHOD FOR SECURING AN ELECTRONIC DEVICE

(71) Applicant: Valeria Suriano, Bitonto (IT)

(72) Inventor: Pasquale Ciccimarra, Altamura (IT)

(73) Assignee: Valeria Suriano, Bitonto (IT)

( * ) Notice: Subject to any disclaimer, the term of this patent is extended or adjusted under 35 U.S.C. 154(b) by 118 days.

(21) Appl. No.: 17/764,377

(22) PCT Filed: Sep. 25, 2020

(86) PCT No.: PCT/IT2020/050230
§ 371 (c)(1),
(2) Date: Mar. 28, 2022

(87) PCT Pub. No.: WO2021/059314
PCT Pub. Date: Apr. 1, 2021

(65) Prior Publication Data
US 2022/0350883 A1    Nov. 3, 2022

(30) Foreign Application Priority Data

Sep. 26, 2019    (IT) .................. 102019000017273

(51) Int. Cl.
*G06F 21/55*    (2013.01)
*G06F 18/21*    (2023.01)
*G06F 18/23213*    (2023.01)
*G06F 12/02*    (2006.01)

(52) U.S. Cl.
CPC ........ *G06F 21/552* (2013.01); *G06F 18/2178* (2023.01); *G06F 18/23213* (2023.01); *G06F 21/554* (2013.01); *G06F 12/0246* (2013.01)

(58) Field of Classification Search
CPC ............................ G06F 12/0246; H04L 63/18
See application file for complete search history.

(56) References Cited

U.S. PATENT DOCUMENTS

| | | | |
|---|---|---|---|
| 5,517,511 A * | 5/1996 | Hardwick | G10L 19/06 704/E19.024 |
| 9,129,110 B1 | 9/2015 | Mason et al. | |
| 2008/0201778 A1 | 8/2008 | Guo et al. | |
| 2017/0061138 A1* | 3/2017 | Lambert | H04L 63/18 |
| 2017/0068470 A1* | 3/2017 | Ravimohan | G06F 12/0246 |
| 2019/0222585 A1 | 7/2019 | Apple et al. | |

FOREIGN PATENT DOCUMENTS

WO    2016/020660    2/2016

OTHER PUBLICATIONS

International Search Report and Written Opinion, issued in the corresponding PCT application No. PCT/IT2020/050230, dated Dec. 4, 2020, 9 pages.

* cited by examiner

*Primary Examiner* — Barbara B Anyan
(74) *Attorney, Agent, or Firm* — HSML P.C.

(57) ABSTRACT

A method for securing the functioning of an electronic device, by using Bayesian statistics techniques.

17 Claims, 6 Drawing Sheets

|       |       | String1 |         | String2 |         |
|-------|-------|---------|---------|---------|---------|
|       |       | Word1   | Word2   | Word3   | Word4   |
| String1 | Word1 | Word1-Word1 | Word1-Word2 | Word1-Word3 | Word1-Word4 |
|         | Word2 | Word2-Word1 | Word2-Word2 | Word2-Word3 | Word2-Word4 |
| String2 | Word3 | Word3-Word1 | Word3-Word2 | Word3-Word3 | Word3-Word4 |
|         | Word4 | Word4-Word1 | Word4-Word2 | Word4-Word3 | Word4-Word4 |

FIG. 15

|                |          | expr1($var1) |              | expr2($var2) |              |
|----------------|----------|--------------|--------------|--------------|--------------|
|                |          | expr1(.)     | $var1        | expr2(.)     | $var2        |
| expr1($var1)   | expr1(.) | expr1(expr1(.)) | expr1($var1) | expr1(expr2(.)) | expr1($var2) |
|                | $var1    | expr1($var1) | $var1var1    | expr2($var1) | $var1var2    |
| expr2($var2)   | expr2(.) | expr2(expr1(.)) | expr2($var1) | expr2(expr2(.)) | expr2($var2) |
|                | $var2    | expr1($var2) | $var2var1    | expr2($var2) | $var2var2    |

FIG. 16

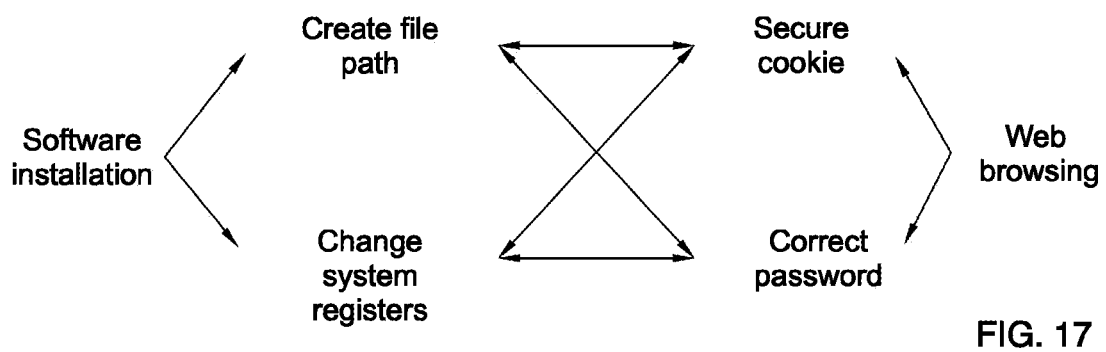

FIG. 17

METHOD FOR SECURING AN ELECTRONIC DEVICE

FIELD OF THE INVENTION

Embodiments described here concern a method and an apparatus for securing an electronic device, which can be used in the field of cyber security, to prevent cyber-attacks and cyber threats of any kind made against electronic devices, that is, structured malfunctions or malfunctions that have occurred over time.

BACKGROUND OF THE INVENTION

Cyber security software is known, for detecting and removing possible cyber threats that can affect electronic devices.

In some cases, cyber threats can comprise malicious data packets, which are transmitted via a computer network, or even by other means, such as for example storage devices, to electronic devices connected to it.

There are also cases of malfunctions, caused by factors internal or external to the device, bugs or unexecuted software updates, which can compromise its functioning.

These cyber threats, which therefore include both malicious attacks and also malfunctions, can therefore affect a large number and a wide variety of electronic devices, networked to other devices, or not.

FIG. 1 schematically shows a possible software architecture of a computer apparatus, which comprises an operating system, stored in a storage peripheral 102b and provided with various software components A, such as for example application programs, and one or more management programs F, for example firmware, stored in storage units 102a integrated into hardware peripherals.

A possible cyber-attack can for example be configured as a malicious data packet, arriving from outside the apparatus, for example from a computer network or even from a USB key, which can be transmitted either by another apparatus or by a human being, as schematically shown in the drawings by continuous arrows.

Damage to the computer apparatus can also be caused by malfunctions of one or more components A, or of the management program F, caused by the most varied reasons, for example bugs, unexecuted software updates or defective updates, production defects, which can induce abnormal and potentially harmful behaviors.

Once it reaches the operating system, the attack or malfunction infects it, for example by corrupting a file, a folder, registers, function libraries, a component A, which therefore becomes an infected component A, indicated by hatching in the drawings.

An infected component A can therefore be any component A of the apparatus, both hardware and software, not operating correctly and consistent with the purposes for which it was intended.

From the infected component A, the attack can infect other components A, access hardware peripherals, infect firmware, or even spread across a network, for example the Internet or LAN, infecting other apparatuses connected to it.

Schematically, the functioning of known antiviruses is based on the comparison between the data associated with the attack arriving on the computer apparatus and a plurality of data stored in a database of threats.

If the data associated with the attack are the same as the data stored, the attack is recognized as a threat and is blocked before it can infect components A.

However, antiviruses based on this type of functioning have the disadvantage that if the attack is of an unknown type, and therefore the data associated with it are not present in the database or the latter is not updated, the attack is not recognized by the antivirus, and infects the operating system.

Moreover, antiviruses based on a database may not recognize harmful behaviors caused by malfunctions or anomalies of various kinds, since such behaviors may not be directly associated with data stored as threatening.

From US patent applications US 2008/201778 A1, US 2019/222585 A1 and U.S. Pat. No. 9,129,110 B1, apparatuses and methods based on the use of Bayesian networks to classify data as malware or identify threats are known.

Antiviruses not based on databases are also known, such as for example the one described in the patent document WO 2016/020660, which have artificial intelligence algorithms that compare the behavior of the operating system, or one of its components, with an ideal behavior, detecting any possible anomalies.

In these cases, however, the detection of the threat occurs only after the threat has reached and infected at least one component A of the operating system, or in any case after any possible anomalies have occurred.

A certain period of time therefore elapses between when the threat attacks the computer apparatus and when it is recognized and eradicated, which, however short, can still allow the threat to cause damage and spread to other apparatuses.

Another type of possible cyber threats are those schematically described in FIG. 2.

These types of threats come from the management programs F of the hardware components and electronic boards of the apparatus.

If it is the management program F that is infected, or any firmware present in the hardware, it is more difficult to eradicate the threat, since the threat could bypass the operating system and cause damage without any known antivirus being able to intervene.

In more severe cases, the infected firmware can be a boot firmware of the electronic device, for example of the UEFI (Unified Extensible Firmware Interface) or BIOS (Basic Input-Output System) type.

UEFI or BIOS firmware is typically pre-installed in the electronic device and is the first software to be executed at booting.

Furthermore, the firmware is used to initialize the hardware and to provide specific services for the operating system and applications, as schematically shown in the drawings by dotted arrows.

In such cases, at the moment the computer is switched on, when the operating system, and therefore also any antiviruses installed therein, has not yet been loaded, the boot firmware is the only active and operational component of the apparatus, and, if possibly infected, can act undisturbed by implementing any type of threat, as schematically shown by continuous arrows.

There is therefore a need to perfect a cyber security system that can overcome at least one of the disadvantages of the state of the art.

In particular, one purpose of the present invention is to provide a method for securing the functioning of an electronic device, whether it is networked or offline, which is more effective than known anti-viruses, in particular those based on databases, thus allowing to detect and prevent threats not stored in a database.

Another purpose of the present invention is to provide a method able to overcome the disadvantages of known antiviruses, in particular those based on the anomaly detection system, allowing threats to be detected and prevented before they can generate the anomalies and enact harmful behaviors.

Another purpose of the present invention is to provide a method able to detect and prevent threats also originating from firmware installed in the hardware components of an electronic device.

It is also a purpose of the invention to intercept and eradicate, right from the booting of the electronic device, possible malicious, anomalous and, in general, harmful behaviors, which may arise for various reasons.

In particular, it is also a purpose of the present invention to provide a method able to detect and prevent threats that can be implemented in the steps of switching on the electronic device, before the operating system, and any antiviruses installed therein, is loaded.

It is also a purpose of the invention to secure electronic devices connected to the network, by intervening on the device both directly, from the inside, and also indirectly, from the outside, by means of other devices connected to it.

It is also a purpose of the invention to secure independent electronic devices, not connected to the network, detecting both attacks and also possible internal malfunctions.

The Applicant has devised, tested and embodied the present invention to overcome the shortcomings of the state of the art and to obtain these and other purposes and advantages.

SUMMARY OF THE INVENTION

The present invention is set forth and characterized in the independent claim. The dependent claims describe other characteristics of the present invention or variants to the main inventive idea.

In accordance with the above purposes, some embodiments described here concern a method for securing the functioning of an electronic device, which overcomes the limits of the state of the art and eliminates the defects present therein.

In some embodiments, the method provides an initial archiving step of known initial empirical data, wherein each of the initial empirical data is assigned a probability that it is harmful or secure, that is, whether or not it is associated with a cyber threat.

In some embodiments, the method provides an operation of de-structuring the empirical data into progressively smaller data portions.

In some embodiments, the method provides an operation of recombining each of the empirical data portions with all or part of the empirical data and with all or part of the other data portions, thus obtaining new data, that is, recombined data, different from the starting data.

In some embodiments, the method provides an operation of assigning to the new data probabilities that they are secure or harmful, using Bayesian statistical techniques, starting from the probabilities assigned to the initial empirical data.

The method then provides to compare a new input with the empirical data and with the new data, in order to evaluate their similarity and assign, as a function of the similarity evaluation, a probability that the input is harmful or secure, that is, whether or not it is associated with a cyber threat.

The probability is assigned starting from the probabilities assigned to the empirical data and to the new data, using Bayesian statistical techniques.

Advantageously, the method of the present invention therefore allows to overcome the disadvantages of the state of the art, since, by de-structuring and recombining the data, it also allows to predict possible new cyber threats, anomalous behaviors, malfunctions, completely unknown and/or not archived behaviors.

Advantageously, the method of the present invention can be used to secure both networked devices and also offline devices.

Advantageously, the method also allows to detect and prevent both threats associated with the operating system, or with one of its components, and also threats associated with hardware peripherals or corresponding management programs.

In further embodiments, the method can secure an electronic device provided with an electronic board and one or more peripheral units connected to or integrated with said electronic board.

In some embodiments, on the electronic board there is provided an integrated storage unit, in which a management program is stored, which, when executed, manages the functioning of the electronic board and the peripheral units, by means of a set of management instructions.

In some embodiments, the method provides:
creating a list of harmful instructions executable by the management program;
storing of a security program in the integrated storage unit;
controlling, in which the security program controls the functioning of the management program, blocking the execution of the harmful instructions and allowing the execution of the management instructions.

In some embodiments, the management program can be a firmware, for example a boot firmware of the UEFI or BIOS type, which manages the booting of an operating system.

The method can therefore be used both for the protection of electronic devices not provided with an operating system, such as for example biomedical diagnostic devices or firmware-based devices, and also for the protection of electronic devices provided with an operating system, in the booting steps, in which the operating system has not yet been loaded.

Advantageously, this solution allows to overcome the disadvantages of the state of the art linked to possible cyber threats coming from infected firmware.

The method of the present invention is therefore more efficient than known methods in detecting cyber threats to electronic devices.

BRIEF DESCRIPTION OF THE DRAWINGS

These and other aspects, characteristics and advantages of the present invention will become apparent from the following description of some embodiments, given as a non-restrictive example with reference to the attached drawings wherein:

FIG. 15 shows a first table that illustrates a possible example of execution of some steps of a method in accordance with some embodiments described here;

FIG. 16 shows a second table that illustrates a possible example of execution of some steps of a method in accordance with some embodiments described here;

FIG. 17 shows another possible example of execution of some steps of a method in accordance with some embodiments described here.

Figure 1:
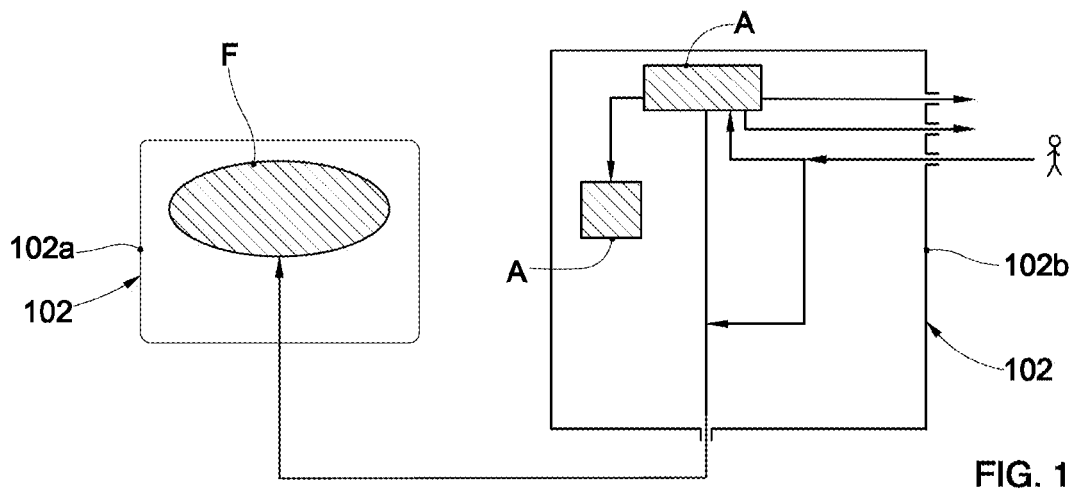
FIG. 1 shows one possible type of cyber threats that can be carried out against an electronic device.
Figure 2:
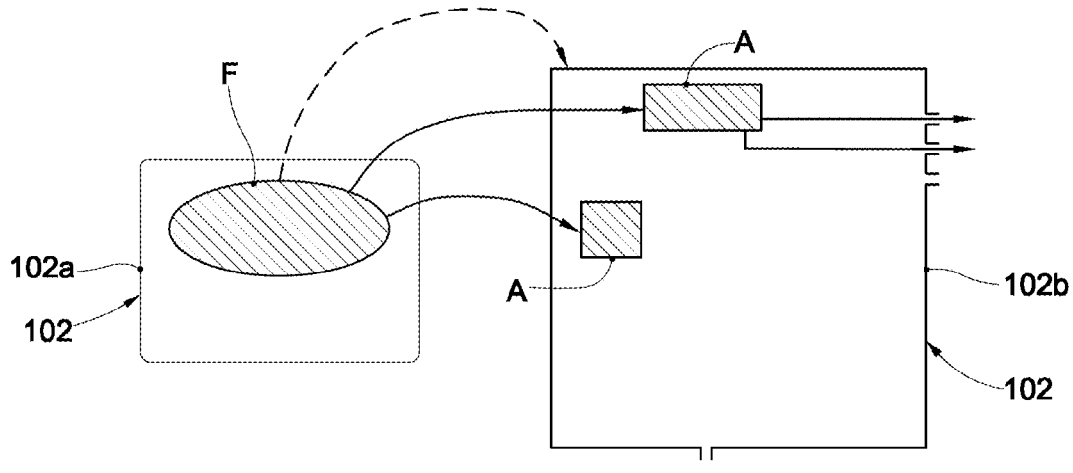
FIG. 2 shows another possible type of cyber threats that can be carried out against an electronic device.

possible examples of execution of some steps of a method in accordance with some embodiments described here.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the possible embodiments of the invention, of which one or more examples are shown in the attached drawings. Each example is supplied by way of illustration of the invention and shall not be understood as a limitation thereof. For example, one or more characteristics shown or described insomuch as they are part of one embodiment can be varied or adopted on, or in association with, other embodiments to produce another embodiments. It is understood that the present invention shall include all such modifications and variants.

Before describing these embodiments, we must also clarify that the present description is not limited in its application to details of the construction and disposition of the components, and schematization of the steps of the method as described in the following description using the attached drawings. The present description can provide other embodiments and can be obtained or executed in various other ways. We must also clarify that the phraseology and terminology used here is for the purposes of description only, and cannot be considered as limitative.

The present invention concerns a method for securing the functioning of an electronic device 100, preventing possible cyber threats.

The electronic device 100 can be connected to a computer network or not, equipped with an operating system or not.

A cyber threat can comprise any type of action whatsoever, operated by means of electronic devices 100, which can, even only potentially, cause damage, intended both as damage to a device, for example compromising its functioning, and also damage to a user, for example theft of money, theft of personal data, violation of privacy of any kind.

The cyber threat can for example comprise cyber-attacks, phishing, email scams, viruses, malware, ransomware, spyware, rootkits, backdoors, and more.

The cyber threat can be carried out either by an individual, such as a hacker, as well as by devices provided with software or malware configured for this purpose.

A cyber threat can also comprise malfunctions of any kind whatsoever associated with an electronic device 100, for example linked to a software or hardware component, for example due to bugs, short circuits, missed software updates or defective updates.

The cyber threat can comprise data, for example files, internally processed by the electronic device 100 or sent/received by it to/from other devices.

The cyber threat can also comprise behaviors enacted by the electronic device 100, for example in the case of applications infected with malware or malfunctions at the hardware and/or software level.

The cyber threat can also comprise behaviors enacted by a human subject, such as a user of the electronic device 100, for example in the case of cyber phishing, or a hacker, for example in the case of opening backdoors.

The data can comprise files in known formats, such as for example .pdf, .doc, .docx, .xls, .xml, .png, .jpg, .jpeg, .mp4, .mp3, .dll, .bat, .msg, .exe, unix shell scripts such as .bash, .tcsh, .sh, .csh, or also others still.

The behaviors can for example comprise:
sending/receiving emails;
exchanging files, both via email and also by means of network protocols such as ftp, sftp, vpn;
accessing websites or network devices, for example via browser or ssh, ftp, sftp, vpn:
installing/removing software or firmware, either manually, operated by a user, or automatically, operated by programs;
executing applications or executable files;
internet browsing.

Internet browsing can comprise countless actions associated with the web, such as clicking on links on web pages, running multimedia files from web pages, opening/closing new browsing windows, accessing sensitive applications, such as home banking or online payments or online purchases, apps connected to transport services, reservations for hotels or other, registering on sites that require the entry of personal data, executing applications or scripts, navigating areas of the web that are not allowed or not indexed, for example the dark web.

The behaviors associated with the electronic devices 100 can always be characterized by alphanumeric data representative of the functioning, such as strings and operating parameters, which allow them to be processed.

Any cyber threat whatsoever can therefore be associated with an input, that is, a data packet, associated both with files and also with behaviors, which is received or detected by the electronic device 100.

Unlike database-based antiviruses, the method of the present invention also allows to prevent cyber threats associated with unknown inputs, not contained in any database or ever previously detected, through the use of a dynamic system, whose functioning is based on operations of de-structuring and recombining data and assigning probability.

In some embodiments, the dynamic system contains all of the data which the method refers to.

Figure 10:
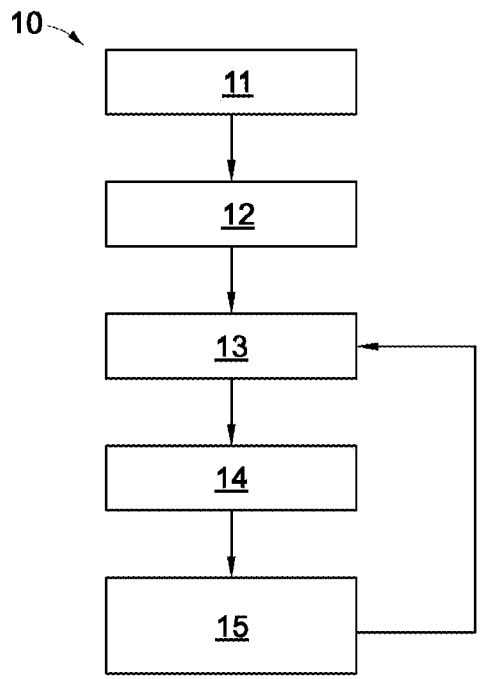
FIG. 10 shows a possible first step of a method in accordance with some embodiments described here.

In some embodiments, schematically described by means of FIG. 10, the method 10 provides a step 11 of generating the dynamic system.

Figure 11:
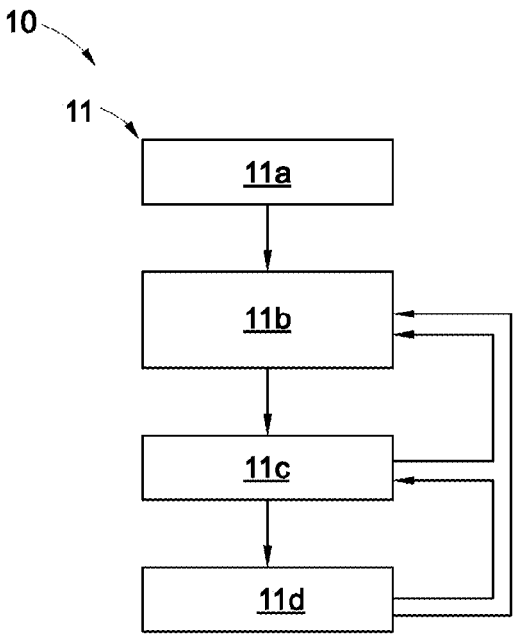
FIG. 11 shows a possible second step of a method in accordance with some embodiments described here.

With reference to FIG. 11, the step 11 of generating the dynamic system can provide an initial step 11a of archiving a plurality of initial empirical data, known to be secure or harmful.

The empirical data can comprise data packets representative of a cyber threat, and can comprise both data associated with files and also data associated with behaviors.

For example, possible empirical data can comprise files or portions of files, or one or more strings contained in a file.

For example, possible empirical data associated with a behavior can comprise a type of actions performed, for example opening a hardware or software gate, using CPU or RAM resources, downloading/uploading files, number of attempts to enter username and password, connecting to a host, certain types of applications that are opened by the operating system, connecting to an email services provider, operations of clicking on hyperlinks, inserting text, the subject of an email or possible attachments.

In some embodiments, each empirical datum can be assigned a probability that it is secure, that is, not associated with a cyber threat, or harmful, that is, associated with a cyber threat.

This probability, also called confidence level, can be associated with the Bayesian statistics definition of probability.

In some embodiments, the confidence levels can comprise prior confidence levels, or prior probabilities, which correspond to the confidence level for the hypothesis that the datum is harmful or secure.

In some embodiments, the prior confidence levels can be used to calculate the posterior confidence levels, or posterior probabilities, within Bayesian statistical calculation procedures.

For example, when a new datum is available, it is possible to verify its similarity with some known data and, starting from the prior confidence levels assigned to the known data, calculate the posterior confidence level for the hypothesis in which the new datum is secure or harmful, by means of Bayes' theorem and the formula for calculating the Bayesian probability.

For example, the posterior probability, $P_{XY}$, of a hypothesis X occurring, once hypothesis Y has been verified, can be calculated, based on Bayes' theorem, as $$P_{XY} = P(X \mid Y) = \frac{P(Y \mid X)P(X)}{P(Y)}$$

where P(X) is the prior probability that the hypothesis X occurs, P(Y) is the prior probability that the hypothesis Y occurs, P(X|Y) is the posterior probability that the hypothesis X occurs, after hypothesis Y has occurred, P(Y|X) is a likelihood function between hypotheses X and Y.

In some embodiments, the hypothesis X can be a hypothesis that a certain datum x is secure (or harmful), with which a prior probability P(X) can be associated.

In some embodiments, the hypothesis Y can be a hypothesis that a certain datum y is secure (or harmful), with which a prior probability P(Y) can be associated.

In some embodiments, the likelihood function, P(Y|X), can be calculated by a likelihood assessment between the two hypotheses X and Y, for example by a similarity assessment between the data x and y.

In some embodiments, the similarity can for example be verified by means of a comparison between files, or between file portions, or between strings, or by means of a comparison between the execution parameters associated with two actions, in the case of behaviors.

For example, it is possible to compare the quantity of identical characters between two strings or between the usage parameters of the CPU and/or the RAM, or the number of requests for connections to IP addresses, in the case of two actions.

In some embodiments, similarity functions can be employed. For example, an angular distance, preferably a similarity cosine or suchlike, can be employed.

The posterior probability P(X|Y), or posterior confidence level, can therefore be associated, for example, with the probability that a certain datum x is secure (hypothesis X), knowing that a datum y is secure (hypothesis Y), once the similarity P(Y|X) between the two data x and y has been verified.

In some embodiments, the posterior probability can be calculated by making changes to the formula indicated above, for example, a modified function of $P'_{XY}$ can be used, obtained by operating on P(X|Y) by means of a function f, as follows:

$$P'_{XY} = f[P(X|Y)].$$

It is also possible to identify the use of another modified function, $P''_{XY}$, obtained by modifying, by means of a function g, the relations between the variables P(X), P(Y), P(X|Y), P(Y|X), as follows:

$$P''_{XY} = g[P(X|Y), P(Y|X), P(X), P(Y)].$$

For example, the functions f and g can multiply each variable by one or more parameters.

In some embodiments, posterior probabilities can be used to improve the estimation of prior probabilities and of the likelihood functions, in a self-consistent manner. Advantageously, the prior probability can be calculated in real time based on the context and based on the scenario. It can therefore be configured into a dynamic variable that always changes in real time depending on the context in which it operates.

In some embodiments, the confidence levels can be assigned both manually by the user, by the software programmer, and also automatically by the software itself.

In some embodiments, the confidence levels can be estimated and subsequently modified and improved, based on observations and events that occur during the functioning of the software.

In some embodiments, the confidence levels can be real numbers, possibly comprised between 0 and 1, where 1 indicates that the hypothesis is certain, that is, the datum is definitely harmful or secure, and 0 indicates that the hypothesis is unreliable, that is, it is not possible to determine whether the datum is secure or harmful.

The empirical data, based on the respective confidence levels, are archived in two subsystems P and Q of the dynamic system: the subsystem P comprises the data known to be secure, or secure known data, while the subsystem Q comprises the data known to be harmful, or harmful known data.

In some embodiments, the generation of the dynamic system can provide one or more processing steps 11b, in which each datum contained in the two subsystems P and Q can be de-structured into progressively smaller datum portions, in order to create a plurality of de-structured data, to which respective confidence levels are assigned.

Figure 12:
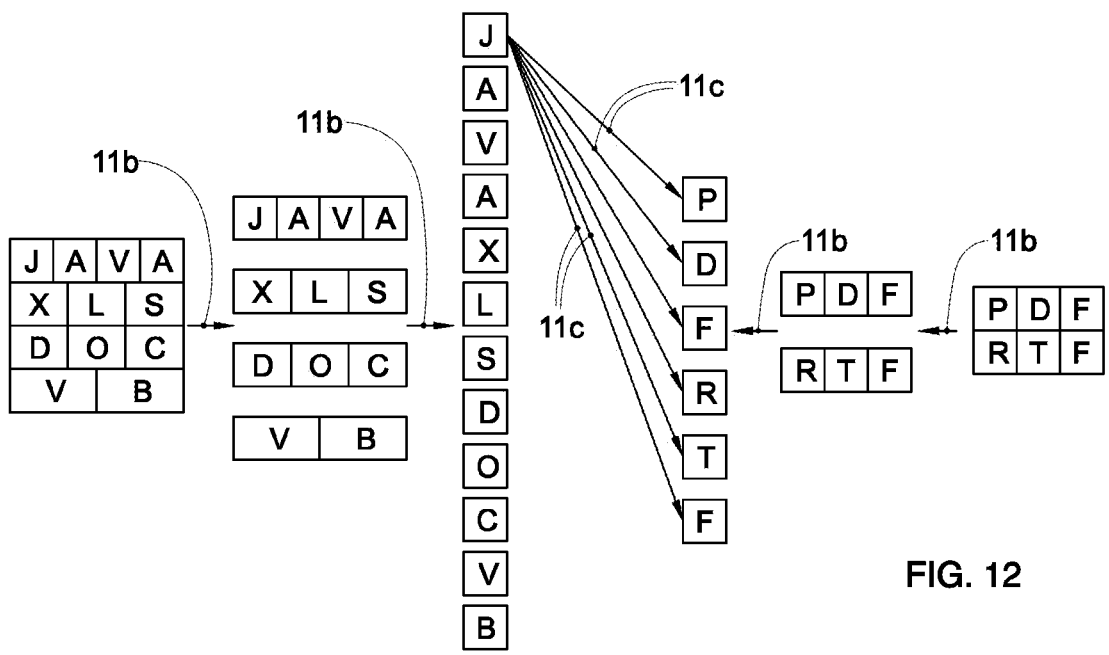
FIG. 12 shows a possible third step of a method in accordance with some embodiments described here.

In particular, with reference to FIG. 12, an empirical datum can be recursively de-structured into datum portions, and each datum portion can be further de-structured into elementary portions, with which it is still possible to associate a meaning and cannot be further de-structured.

The de-structuring can be performed recursively, until the elementary datum portions are isolated.

The data obtained by de-structuring the empirical data can be collectively referred to as de-structured data.

In some embodiments, the de-structured data inherits the confidence levels of the empirical data from which it is obtained.

In other embodiments, the confidence level of one empirical datum is divided among all the de-structured data obtained from it, for example an empirical datum which is associated with a prior confidence level equal to 1 for the hypothesis in which it is secure, can be de-structured into N de-structured data, each having a prior confidence level 1/N for the hypothesis in which it is secure.

In some embodiments, based on the respective confidence levels, the de-structured data can be deemed secure and added to the secure known data contained in subsystem P, or it can be deemed harmful and added to the harmful known data contained in subsystem Q.

With reference to FIG. 11, the generation of the dynamic system can provide one or more steps 11c of expanding the dynamic system, in which the data, both empirical data and also de-structured data, can be recombined with each other, in order to create a plurality of new recombined data, with which respective confidence levels are associated.

The datum portions, or de-structured data, can be recombined with part or all of the initial empirical data, and with part or all of the other datum portions, thus obtaining new data, recombined.

The recombined data are therefore different and new, both with respect to the empirical data and also with respect to the de-structured data.

FIG. 12 shows by way of example a possible recombination operation provided in the step 11c of expanding the dynamic system.

The following table summarizes, by way of example, some types of data that can be defined by the operations of de-structuring and recombining the empirical data:

|  | File | Behaviors |
| --- | --- | --- |
| Empirical data | file, file parts, strings, binary code, etc. | gate opening, CPU, RAM, download/upload, connection to a host, user/password, etc. |
| De-structured data | File portions | Single actions or parameters associated with actions |
| Recombined data |  | All possible combinations |

Practical examples of possible de-structuring and recombination of data are described in more detail in the EXAMPLES at the end of the present description, also with reference to FIGS. 15, 16 and 17.

In some embodiments, it is possible to mathematically combine confidence levels associated with the empirical data or with the de-structured data, in order to assign the confidence levels to the recombined data obtained therefrom, for example by means of addition, averaging, weighted averaging, norm operations.

In some embodiments, the new data are assigned probabilities that they are secure or harmful, using Bayesian statistics techniques, starting from the probabilities assigned to the initial empirical data.

In some embodiments, the probabilities for the new data can be determined or updated using both the known Bayes probability calculation formula ($P_{XY}$), and also the modified formulas ($P'_{XY}$, $P''_{XY}$).

In some embodiments, the confidence levels of the new data can be determined or updated using Bayesian recursive estimation algorithms, for example minimizing the expected value of a posterior probability (or loss function) and/or, equivalently, maximizing the expected value of a prior probability (or utility function).

In some embodiments, a mean squared error function can be used as a loss function and/or utility function.

In some embodiments, the confidence levels of the new data can be determined or updated using Bayesian inference algorithms, in particular inferring the dangerousness of a certain datum on the basis of previous observations.

In some embodiments, the confidence levels of the new data can be determined or updated using Bayesian filter algorithms and equations.

In some embodiments, the confidence levels of the new data can be determined or updated using artificial intelligence.

In some embodiments, the confidence levels can be improved by entering new data or by observing new events, by means of machine learning.

Possible machine learning algorithms can comprise unsupervised learning algorithms, such as partitional clustering, association rule learning, K-means algorithm, and supervised learning algorithms, such as reinforcement learning, which employs a reward function based on the evaluation of its performance.

In some embodiments, the step 11 of generating the dynamic system can provide one or more final archiving steps 11d, in which, on the basis of the respective confidence levels, the new data can be archived into two subsystems of the dynamic system, in particular a subsystem S, containing new data deemed secure, or secure new data, and a subsystem T, containing new data deemed harmful, or harmful new data.

In particular, the similarity between the new data and the data present in the subsystems P and Q can be evaluated, associating respective confidence levels to the hypotheses in which the new data are harmful or secure.

The new data that are similar to the data contained in subsystem P are archived in subsystem S, while new data that are similar to the data contained in subsystem Q are archived in subsystem T, thus updating subsystems S and T of the dynamic system.

The dynamic system thus generated therefore comprises the union of the four subsystems P, Q, S, T, respectively associated with secure known data, harmful known data, secure new data, harmful new data, which in turn comprise empirical data, de-structured data and recombined data.

In some embodiments, steps 11b, 11c and 11d can be executed recursively, as indicated by the arrows in FIG. 11, in order to de-structure and recombine the data of each subsystem into all possible combinations.

In particular, whenever a de-structured datum is generated in step 11b, it can be recombined with all the other data present in all the subsystems P, Q, S, T, and whenever a new recombined datum is generated in step 11c, it can be directly recombined, or de-structured and then recombined, with all the other data present in all the subsystems P, Q, S, T.

It is obvious to a person of skill in the art that one, or more, or all of the steps 11a, 11b, 11c, 11d described here to generate the dynamic system can be carried out or repeated, even in a sequence other than that described here, whenever there is a desire to add one or more new data to one or more of the subsystems P, Q, S, T.

The generation of the dynamic system can therefore be intended both in the sense of creating a new dynamic system and also, as reported below, of updating an already existing dynamic system by adding new data.

It is obvious to a person of skill in the art that the dynamic system, in particular the empirical, de-structured and recombined data can both be saved on a permanent storage unit 102, for example in a file on HD or SSD, and also be recalculated every time they are needed and made temporarily available in RAM.

In some embodiments, the data can be saved in storage units 102 and made remotely accessible, for example available online, in particular in the cloud.

It is also obvious that it is also possible to generate only the de-structured and recombined data that are needed on each occasion, so as to contain the use of computational resources required by the software.

Saving the data on disk, keeping them in RAM, or recalculating them when required can constitute variants of the method that are not alternative to each other, which can depend on the particular implementation and which can be chosen based on requirements, for example based on the power of the processor, the amount of RAM and memory available, the workload running on the electronic device 100.

The method 10 of the present invention can therefore secure the functioning of an electronic device 100 by using the dynamic system thus generated.

In embodiments schematically described by means of FIG. 10, the method provides a step 12 of detecting an input, which could possibly be associated with a cyber threat.

The new input detected is compared with the empirical data and the new data, in order to evaluate its similarity and assign a probability that it is secure or harmful, using Bayesian statistics techniques, starting from the probabilities assigned to the empirical data and to the new data.

In particular, in some embodiments, the method 10 can provide a step 13 of comparing the input with the secure known data and the harmful known data contained in the subsystems P and Q.

Figure 13:
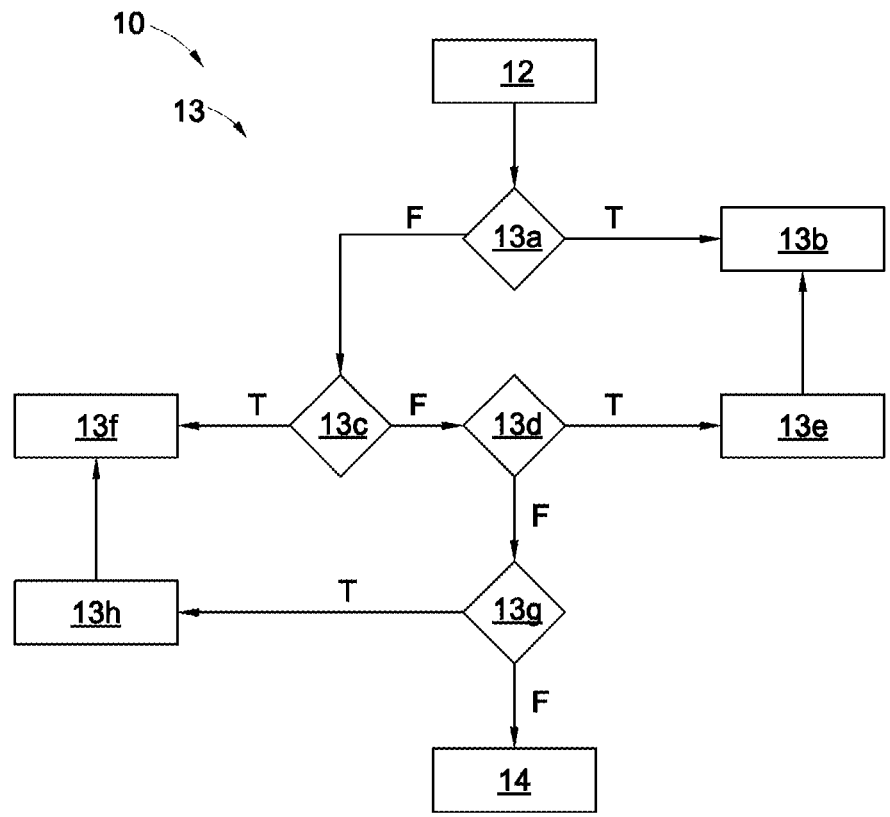
FIG. 13 shows a possible fourth step of a method in accordance with some embodiments described here.

With reference to FIG. 13, the comparison step 13 can provide an operation 13a in which the presence of the detected input in the subsystem P of the dynamic system is checked.

If it is present, the input is identified as secure and executed (operation 13b).

If it is not present, the presence of the detected input in the subsystem Q of the dynamic system is checked (operation 13c).

If it is present, the input is identified as harmful and blocked (operation 13f).

If it is not present, the similarity between the input and the secure known data present in subsystem P is verified (operation 13d), associating a posterior confidence level with the hypothesis in which the input is secure with respect to the known data.

If the posterior confidence level of the hypothesis in which the input is secure with respect to the known data is higher than a first confidence threshold, the data associated with the input are archived in subsystem S (operation 13e) and the input is considered secure and executed (operation 13b).

Otherwise, the similarity between the input and the data present in the subsystem Q is verified (operation 13g), associating a posterior confidence level with the hypothesis in which the input is harmful with respect to the known data.

If the posterior confidence level of the hypothesis in which the input is harmful with respect to the known data is higher than a first confidence threshold, the data associated with the input are archived in subsystem T (operation 13h) and the input is considered harmful and blocked (operation 13f).

Otherwise, the method 10 can provide a step 14 of updating the dynamic system, in which the dynamic system, in particular the subsystems S and T, is updated with the new data associated with the input, according to the modes previously described with reference to FIG. 11 for the step 11 of generating the dynamic system.

In particular, the input can be archived (step 11a), assigning a level of confidence, or probability, that it is secure or harmful, and then processed (step 11b), by de-structuring it into progressively smaller portions.

It is therefore possible to expand (step 11c) the dynamic system by recombining the input portions, or the input itself, with the data present therein, thus obtaining new data, which are assigned probabilities that they are secure or harmful, using the methodologies previously described.

In the final archiving step 11d, the subsystem S of secure new data and the subsystem T of harmful new data are updated with the new data obtained from the input.

In embodiments schematically described by means of FIG. 10, the method 10 can provide an evaluation step 15 in which the new input is compared with the secure new data and the harmful new data updated in the dynamic system, in order to assign a probability that it is secure or harmful.

Figure 14:
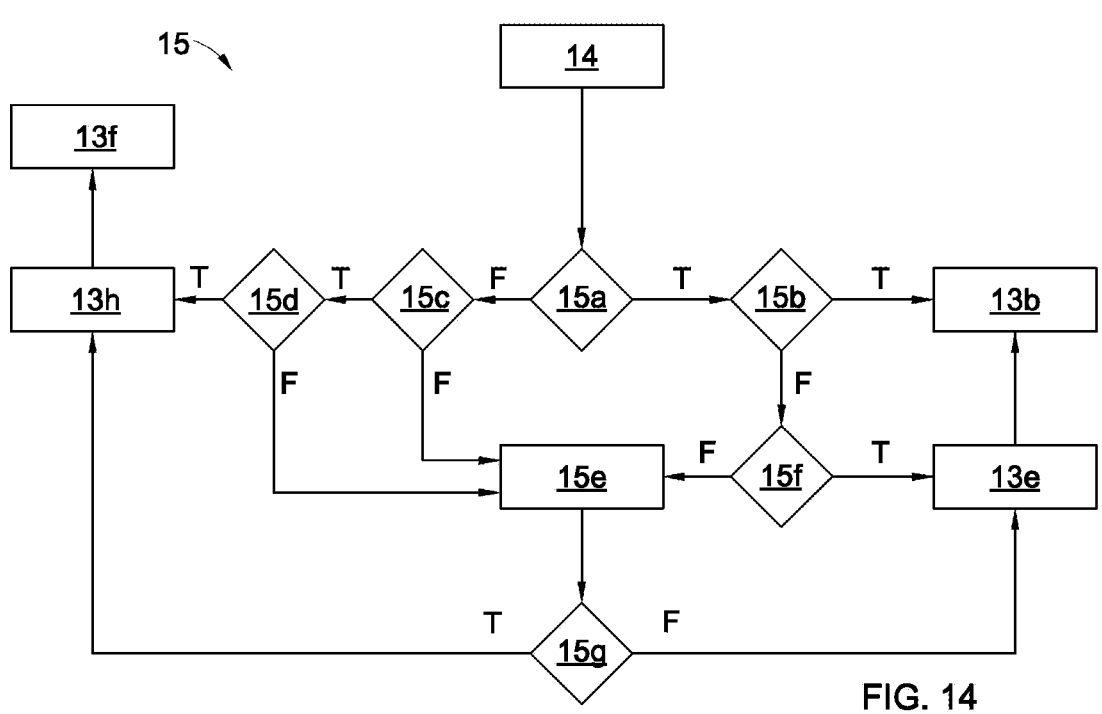
FIG. 14 shows a possible fifth step of a method in accordance with some embodiments described here.

In embodiments schematically described by means of FIG. 14, in the evaluation step 15 there is a check (operation 15a) to establish whether the confidence level of the hypothesis in which the input is secure with respect to the secure known data, contained in subsystem P, is higher than a second confidence threshold.

If it is, it is verified whether the confidence level of the hypothesis in which the input is secure with respect to the secure new data, contained in subsystem S, is higher than the first confidence threshold (operation 15b).

If it is, the input is deemed secure and executed (operation 13b).

If it is not, it is verified whether the confidence level of the hypothesis in which the input is secure with respect to the secure new data is higher than the second confidence threshold (operation 15f).

If it is, the input is added to subsystem S (operation 13e), deemed secure and executed (operation 13b).

If it is not, the input is executed on a virtual machine in order to verify its danger (operation 15e).

If the confidence level of the hypothesis in which the input is secure with respect to known data is lower than the second confidence threshold (operation 15a), it is verified whether the confidence level of the hypothesis in which the input is harmful with respect to the harmful known data, contained in subsystem Q, is higher than the second confidence threshold.

If it is not, the input is executed on a virtual machine in order to verify its danger (operation 15e).

If it is, it is verified (operation 15d) whether the confidence level of the hypothesis that the input is harmful with respect to the harmful new data, contained in subsystem T, is higher than the second confidence threshold.

If it is, the data associated with the input are archived in subsystem T (operation 13h) and the input is considered harmful and blocked (operation 13f).

If it is not, the input is executed on a virtual machine in order to verify its danger (operation 15e).

During the execution of the input on the virtual machine (operation 15e), the danger of the input can be explicitly verified and therefore, depending on the result, the input data can be archived in subsystem S (operation 13e) or T (operation 13h), and the input can be deemed secure and executed (operation 13b) or harmful and blocked (operation 13f).

In some embodiments, the first confidence threshold can be comprised between 0.5 and 0.9999, in particular between 0.8 and 0.9999, even more particularly between 0.9999 and 0.90, for example 0.98.

In some embodiments, the second confidence threshold can be comprised between 0.4 and 0.8, in particular between 0.5 and 0.7, even more particularly between 0.55 and 0.65, for example 0.6.

The method of the present invention, unlike known database-based methods, is therefore not limited to comparing the input of a threat with a database or archive of known threats or with ideal behaviors, but, on the basis of known threats, it generates hypotheses of new cyber threats with which confidence levels are associated, and which are compared with the input.

Embodiments described by means of FIGS. 3, 4, 5, 6, 7, 8 concern a program PA, PS for an electronic device 100, for securing the functioning of the electronic device 100 on which it is installed, or also of other devices or hardware components.

The program PA, PS can be stored in a means readable by an electronic device 100, for example a storage unit 102, and contains instructions which, once executed, determine the execution of the method 10 described here.

Figure 4:
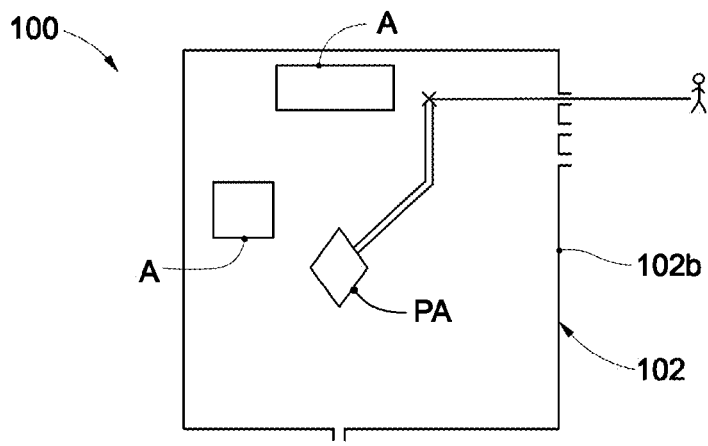
FIG. 4 shows a second step of the functioning of a program based on a method in accordance with some embodiments described here.

With reference to FIG. 4, the program PA, PS can comprise an application program PA, which can be installed in an operating system of an electronic device 100, for example a computer, in order to prevent cyber threats, as shown by double solid lines, for example directed toward a hardware or software component A.

Figure 5:
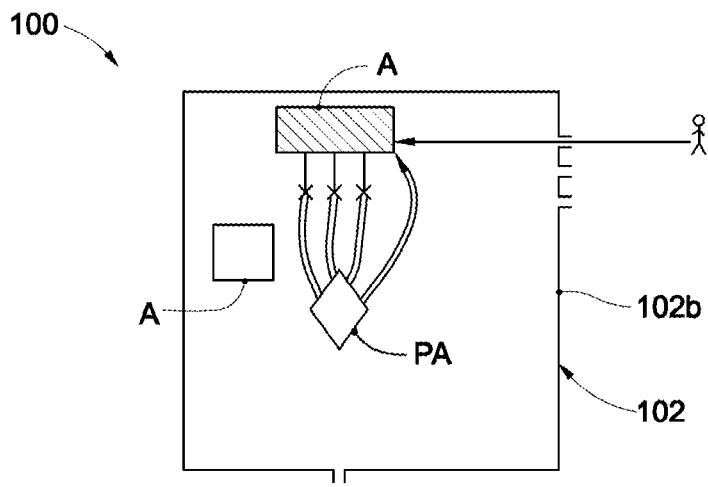
FIG. 5 shows a third step of the functioning of a program based on a method in accordance with some embodiments described here.

With reference to FIG. 5, the application program PA can also detect possible anomalous behaviors of components A of the operating system that are under cyber-attack, or also that are subject to a malfunction, preventing and avoiding possible damage, as schematically shown by the double solid lines.

In some embodiments, the program can also comprise a security program PS, present in a storage unit 102 of a hardware or of the device 100 itself.

The storage unit 102 can be for example a hard disk (HD), a hard disk based on SSD (Solid State Drive) technology, a RAM (Rapid Access Memory), ROM (Read-Only Memory), PROM (Programmable Read-Only Memory), EPROM (Erasable Programmable Read-Only Memory), EEPROM (Electrically Erasable Programmable Read-Only Memory), flash memory.

Figure 7:
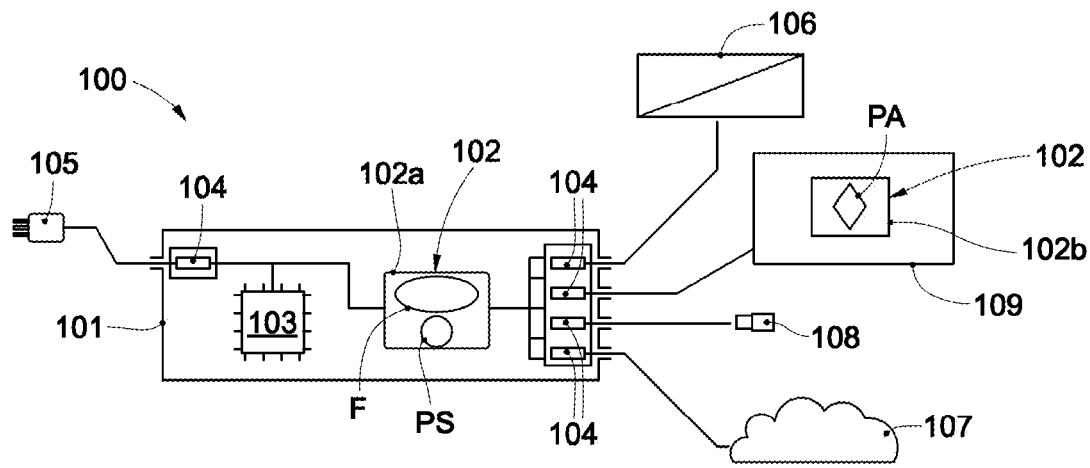
FIG. 7 shows a possible electronic device in which a program is present based on a method in accordance with some embodiments described here.
Figure 8:
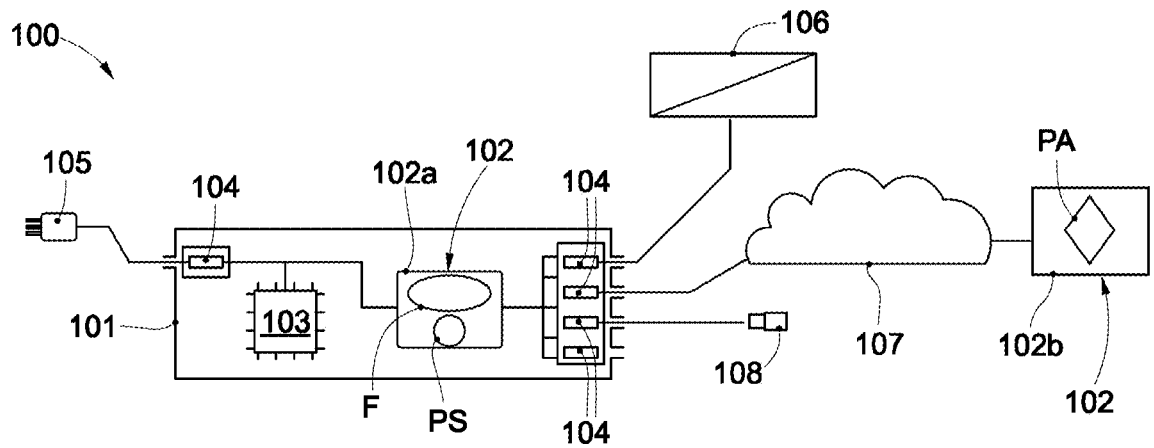
FIG. 8 shows another possible electronic device in which a program is present based on a method in accordance with some embodiments described here.

In embodiments schematically described by means of FIGS. 7 and 8, the electronic device 100 comprises an electronic board 101, also called in some cases motherboard, which contains the circuits and main components necessary for the functioning of the electronic device 100.

In some embodiments, the storage unit 102 can comprise, or can be configured as, an integrated storage unit 102a, that is, integrated on the electronic board 101, for example an EPROM type memory.

In some embodiments, the integrated storage unit 102a can be a storage unit 102 integrated in any type of hardware whatsoever.

In some embodiments, the integrated storage unit 102a can contain a management program F which, when executed, manages the functioning of the electronic board 101 and of the hardware and software resources of the electronic device 100 in general, by means of a set of management instructions.

In some embodiments, the management program F can for example be configured as a firmware, for example a boot firmware such as BIOS or UEFI.

In some embodiments, the electronic device 100 comprises a plurality of peripheral units, or simply peripherals 103, 105, 106, 107, 108, 109 connected to or integrated with the electronic board 101, which can each have one or more specific functions, the functioning of which can be coordinated and managed by the management program F.

The peripherals 103, 105, 106, 107, 108, 109 can be understood as any component whatsoever electrically and/or electronically and/or computationally connected to or integrated on the electronic board 101, both directly, that is, by means of special circuits that directly connect the peripheral 103, 105, 106, 107, 108, 109 to the electronic board 101, and also indirectly, in those cases where the connection is mediated by other components.

In some embodiments, there can be provided, integrated on the electronic board 101, a peripheral 103, 105, 106, 107, 108, 109 for processing and executing instructions and operations, also called processing unit 103, for example a CPU (Central Processing Unit), VPU (Visual Processing Unit), GPU (Graphics Processing Unit), GPGPU (General Purpose computing on Graphics Processing Unit), TPU (Tensor Processing Unit), possibly multicore, microprocessors of any type whatsoever, microcontrollers of any type whatsoever, RISC (Reduced Instruction Set Computer) systems, for example ARM (Advanced RISC Machine), CISC (Complex Instruction Set Computer) systems.

In some embodiments, the peripherals 103, 105, 106, 107, 108, 109 can also comprise apparatuses, devices, circuits and components external to the electronic board 101, connected to it by means of gates 104.

In some embodiments, the peripherals 103, 105, 106, 107, 108, 109 can also comprise power supply peripherals 105, for connection to an electric power supply network, interface peripherals 106, which allow man-machine interaction, network devices 107, to connect the electronic device 100 to a computer network, for example an internet network or LAN (Local Area Network), archiving devices 108, 109 for storing data in digital format, which comprise storage units 102, in this case configured as peripheral storage units 102b.

The archiving devices 108, 109 can be configured as portable archiving devices 107, such as USB keys, floppy disks, CD-ROMs, DVDs, SD cards, or mass archiving devices 108, for example HD, SSD type memories or even memories of another type, and they can be either stably mounted on the electronic device 100, or insertable/removable by a user as required.

In embodiments schematically described by means of FIG. 8, the electronic device 100 can be a device which does not provide an operating system, and which is therefore managed directly by the management program F, such as for example devices for biomedical applications, such as diagnostic apparatuses, household appliances, televisions, eBook readers, or other.

In embodiments schematically described by means of FIG. 7, the electronic device 100 can be a device that does provide an operating system, and the management program F manages the steps of powering up the device and booting the operating system.

The cyber threat can therefore originate from the computer network to which the electronic device 100 is connected, from the peripherals 103, 105, 106, 107, 108, 109 or even from internal malfunctions.

The present invention can therefore be used both for securing networked electronic devices 100, and also offline electronic devices 100, not networked and, for example, threatened by an internal malfunction.

Some embodiments described here concern a method 10 for securing the functioning of the electronic device 100.

In some embodiments, the method 10 provides:
creating a list of harmful instructions executable by the management program F;
storing the security program PS in the integrated storage unit 102a;
controlling, in which the security program PS controls the functioning of the management program F, blocking the execution of the harmful instructions and allowing the execution of the management instructions.

In some embodiments, the step of creating the list of harmful instructions, executable by the management program F, can be provided in the steps 11a of initial archiving and/or 11d of final archiving of the dynamic system, previously described with reference to FIGS. 10 and 11, both at the same time as the generation (step 11) of the dynamic system, and also at the same time as its update (step 14).

In particular, the harmful instructions can be comprised among the known initial empirical data, and archived in the initial archiving step 11a.

Furthermore, harmful new instructions can be obtained by de-structuring and recombining the known instructions with each other, or with new instructions associated with new inputs and new data that are detected by the electronic device 100.

In some embodiments, the method 10 can be used for protecting both electronic devices 100 not provided with an operating system, and also electronic devices 100 provided with an operating system, in the moments when the operating system is not active, for example in the powering up step.

Figure 3:
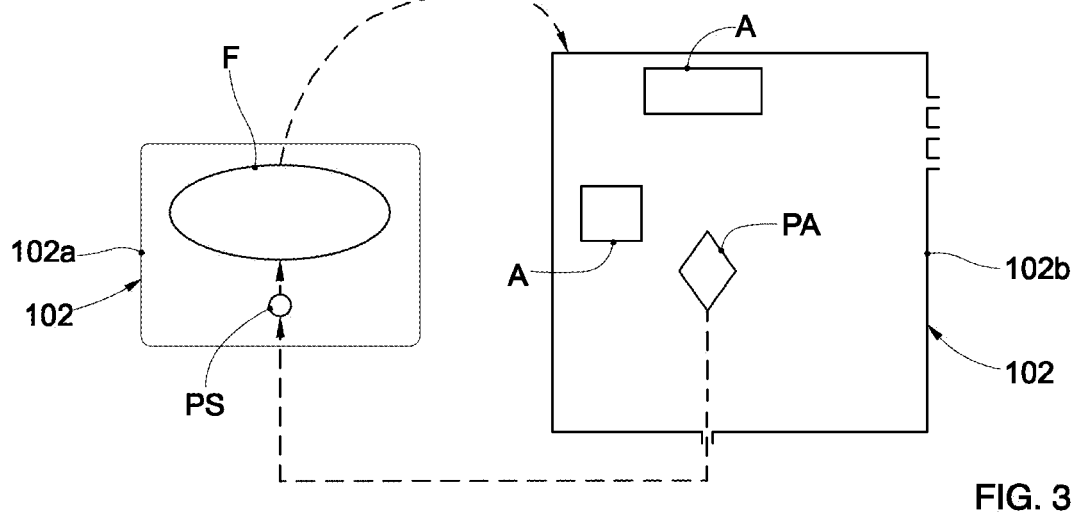
FIG. 3 shows a first step of the functioning of a program based on a method in accordance with some embodiments described here.

With reference to FIG. 3, the step of creating a list of harmful instructions executable by the management program F can be carried out by the application program PA present in the operating system, for example configured as a set of instructions stored in the peripheral storage unit 102b.

In particular, with the device switched on, the application program PA can transmit the list to the security program PS stored in the integrated storage unit 102a, and the security program PS can control the functioning of the management program F, as shown schematically by the dashed arrows.

The security program PS can then be updated with the new data detected by the application program PA.

In embodiments described by way of example in FIG. 7, the peripheral storage unit 102b in which the application program PA is installed and the integrated storage unit 102a in which the security program PS is installed can be provided in the same electronic device 100.

In these embodiments, the present invention allows to secure the functioning of the electronic device 100 even if it is not connected to a computer network.

In embodiments described by way of example in FIG. 8, the peripheral storage unit 102b in which the application program PA is installed and the integrated storage unit 102a in which the security program PS is installed are provided in different devices, connected for example by means of a network device 107.

In these embodiments, the application program PA can transmit the list of harmful instructions to the security program PS by means of a network protocol, for example internet or LAN.

During the step of powering up the electronic device 100, when the application program PA is not active, the security program PS can in any case guarantee the correct functioning of the management program F, blocking and preventing possible cyber threats.

This characteristic allows to prevent the emergence of threats, for example in the step of booting the electronic device 100 and in the boot steps of the operating system, that is, when the electronic device 100 is most vulnerable.

Figure 6:
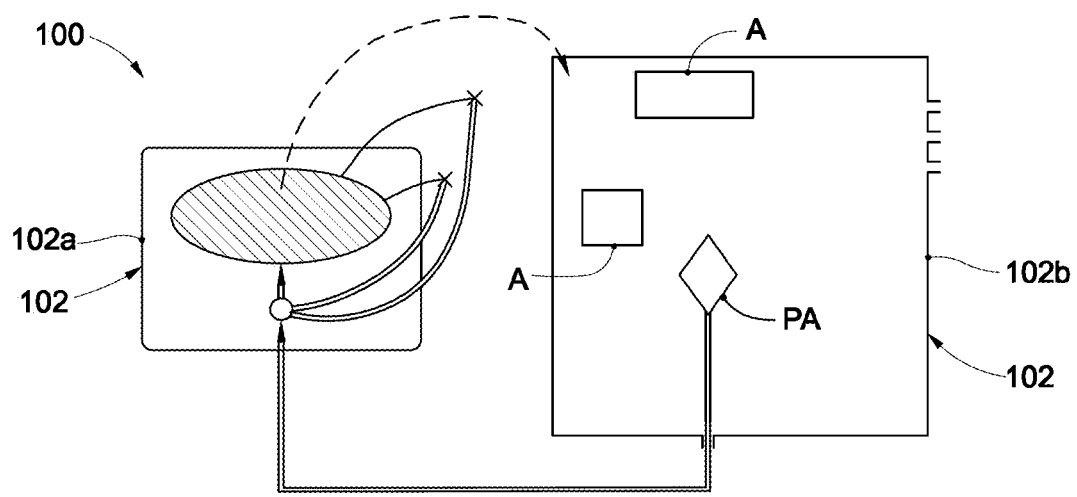
FIG. 6 shows a fourth step of the functioning of a program based on a method in accordance with some embodiments described here.

Furthermore, as shown in FIG. 6, when the electronic device 100 is switched on, the application program PA can verify the correct functioning of the security program PS, preventing possible cyber threats from compromising its functioning and possibly updating the list of harmful instructions.

This characteristic therefore allows to keep the list of harmful instructions of the security program PS updated.

Figure 9:
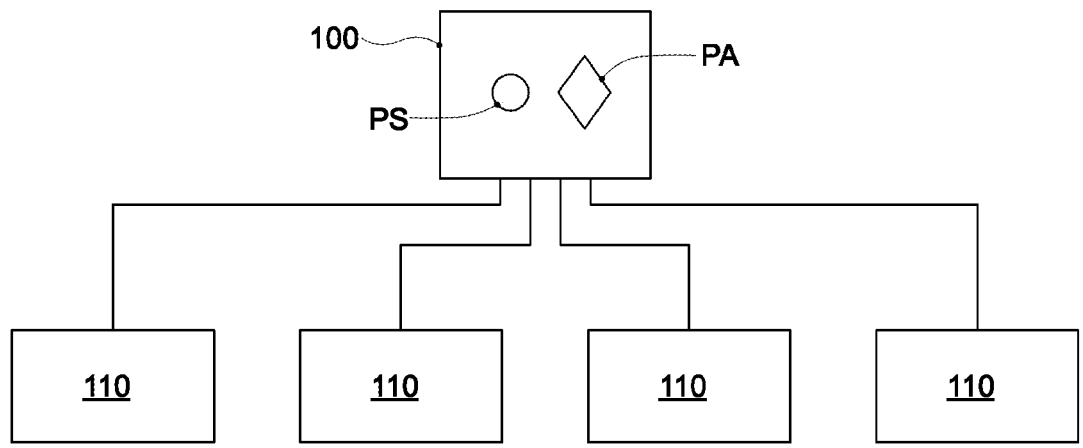
FIG. 9 shows another possible electronic device in which a program is present based on a method in accordance with some embodiments described here.

In embodiments described by way of example by means of FIG. 9, the method 10 of the present invention can protect a plurality of client devices 110, of any type whatsoever, connected to each other by means of an electronic device 100 configured as a server, and provided with an application program PA and/or a security program PS.

In this case, for example, the application program PA can be installed on the operating system of the server, for securing the functioning both of the server itself and also of the client devices 110 while the server is switched on, while the security program PS can prevent cyber-attacks to the server during the power up steps.

Example 1

Table 1 shows an example in which two data configured as two strings, String1 and String2, can be de-structured and recombined.

For example, String1 can be a URL of the type "/host1/folder1", associated with an html instruction of the type:
<a href="http://String1/file.html"></a>,
which points to a host1, for example a website.

For example, String2 can be a path of the type "/host2/folder2", associated with a shell command of the type:
"Ftp user@String2/file2.doc",
which points to a host2.

By combining these strings together, it is possible to obtain new strings, such as for example "/host1/folder1:/host2/folder2".

In the data de-structuring step, the strings can be de-structured into the words Word1, Word2, Word3, Word4, which for example can be respectively "/host1", "/folder1", "/host2", "/folder2".

During the data recombining step, all possible combinations between the words can be generated, for example those shown in Table 1, and new data can be generated such as for example "/host1/host1", "/host1/folder2", "/host2/host2", "/host2/folder1", and more.

Combinations between words and strings can also be generated, such as for example "/host1/folder1/folder2".

Furthermore, the data can be de-structured again until smaller portions are obtained. For example, the words Word1, Word2, Word3 and Word4 can be de-structured into sequences of one or more characters, such as "o", "ol", "der2".

The data can be further de-structured until the elementary portions are obtained, which in this case can be one or more bytes of information, for example sequences of 0 and 1, such as "0", "01", "101", which can be recombined with each other. For example, a new sequence "01101" can be obtained from sequences "01" and "101".

Such data can later be associated with a confidence level that derives from the confidence levels of the previous data, for example, the combination "/host1/folder2" can be associated with a high probability that it is a threat if the initial address host1 was known to be malicious.

Example 2

Table 2 shows another example of data de-structuring and recombining, in which two files containing instructions, for example C code, Java, bash script, or suchlike, are de-structured into their constituent lines of code.

In these types of files it is possible to find instructions in which an expression, for example expr1(•) and expr2(•), operates on a variable, for example $var1 and $var2.

In the de-structuring step, the expression can be recognized and separated from the variables on which it operates, as shown in the table.

In the recombining step, the expressions and the variables can be mixed together, so that, starting for example from known empirical data of the type expr1($var1) and expr2($var2), it is possible to obtain new expressions of the type expr1(expr2(•)), expr1(expr1(•)), or also new variables such as $var1var1 or $var1var2, or also new combinations of expressions and variables such as for example expr1(expr2($var2var1)).

For example, from the combination of $var1=HOST1 and $var2=HOST2, it is possible to generate the new variable $var1var2=HOST1:HOST2.

If therefore, for example, expr2($var2) is a known function for opening a link to the benevolent host HOST2 and expr1($var1) is a known function for opening a link to the malicious host HOST1, the combination expr2($var1var2) will be assigned a probability that it is malicious, since it will open a connection both to HOST1 and also HOST2.

Example 3

FIG. 15 shows another example, relating to the de-structuring and recombination of behaviors.

The example shown in the drawing shows web browsing and software installation behaviors, which can be de-structured into individual actions.

In the example, the software installation and the web browsing have been de-structured into creation of a harmful file, change of system registers, download of a cookie, correct entry of a password.

During the recombining step, it is therefore possible, for example, to predict a new behavior for the web browsing, in which harmful files are created, or the system registers are modified, or a new behavior for the installation of a software, in which it is required to enter a password or download a secure cookie from a website.

The confidence levels are updated based on the confidence levels associated with the individual actions.

It is clear that modifications and/or additions of steps of parts may be made to the method and to the devices as described heretofore, without departing from the field and scope of the present invention.

It is also clear that, although the present invention has been described with reference to some specific examples, a person of skill in the art shall certainly be able to achieve many other equivalent forms of method, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A method for securing the functioning of an electronic device, comprising:
   initial archiving of initial empirical data that is known initial empirical data, wherein each of said initial empirical data is assigned a probability that each of said initial empirical data is secure or harmful;
   de-structuring said initial empirical data into progressively smaller data portions;
   recombining each of said data portions with part or all of said initial empirical data and with part or all of other datum portions, thus obtaining new recombined data;
   assigning to said new recombined data a probability that said new recombined data are secure or harmful, using Bayesian statistics techniques, starting from said probabilities assigned to the known initial empirical data; and
   comparing a new input detected by said electronic device with said initial empirical data and said new recombined data, in order to evaluate the similarity between said new input and said initial empirical data and between said new input and said new recombined data, and to assign, as a function of said similarity evaluation, a probability that said new input is secure or harmful, using Bayesian statistics techniques, starting from said probabilities assigned to the initial empirical data and to the new recombined data.

2. The method as in claim 1, further comprising:
   generating a dynamic system, which includes:
      said initial archiving of the initial empirical data that is known initial empirical data, in which secure empirical data of the initial empirical data are archived in a subsystem of secure known empirical data, and harmful empirical data of the initial empirical data are archived in a subsystem of harmful known empirical data,
      processing of the initial empirical data that includes the de-structuring said initial empirical data,
      expanding the dynamic system which includes the recombining of the data portions to obtain the new recombined data and the assigning of probabilities that the new recombined data are secure or harmful;
      archiving the new recombined data in which, based on the respective probabilities, the new recombined data are organized into a subsystem of secure new recombined data and a subsystem of harmful new data, wherein said dynamic system is a union of said four subsystems.

3. The method as in claim 2, further comprising:
updating said dynamic system that includes:
de-structuring the new input into input portions;
expanding the dynamic system which includes recombining the input portions and data present in the dynamic system, thus obtaining new recombined input data, and assigning probabilities that the new recombined input data are secure or harmful;
archiving the new recombined input data, in which the subsystem of secure new data and the subsystem of harmful new data are updated with the new recombined input data.

4. The method as in claim 3,
wherein the comparing of the new input in order to assign the probability that said new input is secure or harmful includes:
comparing said new input with the secure empirical data and the harmful empirical data contained in the dynamic system;
in response to the new input not being present in the secure empirical data and the harmful empirical data, updating the dynamic system with the new input;
comparing the new input with the secure new data and the harmful new data updated in the dynamic system, in order to assign the probability that the new input is secure or harmful.

5. The method as in claim 1, wherein the probabilities assigned in said initial archiving are prior probabilities of Bayesian statistics, and said probabilities assigned using Bayesian statistics techniques are posterior probabilities of Bayesian statistics.

6. The method as in claim 5, wherein said posterior probabilities of Bayesian statistics are obtained by means of a modified Bayesian probability formula.

7. The method as in claim 1, wherein said Bayesian statistics techniques comprise a recursive Bayesian estimation algorithm, which uses a mean squared error function.

8. The method as in claim 1, wherein said Bayesian statistics techniques comprise a Bayesian inference algorithm.

9. The method as in claim 1, wherein said Bayesian statistics techniques comprise a Bayesian filter algorithm.

10. The method as in claim 1, wherein said probabilities assigned using Bayesian statistics techniques are calculated by an artificial intelligence employing machine learning algorithms.

11. The method as in claim 10, wherein said machine learning algorithms comprise unsupervised learning, in particular partitional clustering, association rule learning, K-means algorithm.

12. The method as in claim 10, wherein said machine learning algorithms comprise supervised learning, in particular reinforcement learning, which uses a reward function based on the evaluation of its own performance.

13. A program stored in a means readable by an electronic device that contains instructions which, once executed, cause the electronic device to perform the method as in claim 1.

14. The program as in claim 13, which comprises a computer application program, storable in a peripheral storage unit of a computer that contains the instructions which, once executed, cause the computer to perform the method as in claim 1.

15. The program as in claim 14, which comprises a security program present in an integrated storage unit in an electronic board of a hardware, a management program being present in said integrated storage unit which, when executed, manages the functioning of said hardware by means of a set of management instructions, said application program configured to transmit a list of harmful instructions, executable by said management program, to said security program, said security program controlling the functioning of said management program, blocking the execution of said harmful instructions and allowing the execution of said management instructions.

16. An electronic device provided with a storage unit that contains instructions which, once executed, causes the electronic device to perform the method as in claim 1.

17. The electronic device comprising an integrated storage unit in a hardware, in which a management program that manages the functioning of the hardware and a security program that controls the functioning of the management program are present, and a peripheral storage unit, in which the application program as in claim 15 is present.

* * * * *